United States Patent
Xiong et al.

(10) Patent No.: US 10,022,874 B1
(45) Date of Patent: Jul. 17, 2018

(54) ROBOTIC HAND

(71) Applicant: UBTECH Robotics Corp., Shenzhen (CN)

(72) Inventors: Youjun Xiong, Shenzhen (CN); Yong Fu, Shenzhen (CN); Hongyu Ding, Shenzhen (CN)

(73) Assignee: UBTECH Robotics Corp., Shenzhen (CN)

( * ) Notice: Subject to any disclaimer, the term of this patent is extended or adjusted under 35 U.S.C. 154(b) by 0 days.

(21) Appl. No.: 15/798,415

(22) Filed: Oct. 31, 2017

(30) Foreign Application Priority Data

Sep. 28, 2017 (CN) .......................... 2017 1 0902052

(51) Int. Cl.
  *B25J 15/02* (2006.01)
  *B25J 15/10* (2006.01)
  *B25J 15/00* (2006.01)

(52) U.S. Cl.
  CPC ....... *B25J 15/0028* (2013.01); *B25J 15/0213* (2013.01); *B25J 15/10* (2013.01)

(58) Field of Classification Search
  CPC . Y10S 901/38; B25J 15/0028; B25J 15/0213; B25J 15/086; B25J 15/10; B25J 15/103
  USPC ....................................................... 294/106
  See application file for complete search history.

(56) References Cited

U.S. PATENT DOCUMENTS

| | | | | |
|---|---|---|---|---|
| 3,370,213 A | * | 2/1968 | Rose | B25J 13/082 294/106 |
| 3,901,547 A | * | 8/1975 | Skinner,II | B25J 15/103 294/106 |
| 4,858,979 A | * | 8/1989 | Parma | B25J 15/0052 294/106 |
| 6,505,871 B2 | * | 1/2003 | McCormick | B25J 15/028 294/119.1 |
| 8,424,942 B2 | * | 4/2013 | Park | B25J 15/10 294/106 |
| 8,439,414 B2 | * | 5/2013 | Neeper | B25J 9/102 294/119.1 |
| 8,474,893 B2 | * | 7/2013 | Kawanami | B25J 15/0213 294/106 |
| 9,718,195 B1 | * | 8/2017 | Youmans | B25J 15/12 |
| 2005/0017529 A1 | * | 1/2005 | Rogers | B25J 13/085 294/103.1 |
| 2009/0179445 A1 | * | 7/2009 | Coville | B66C 1/425 294/106 |
| 2015/0151438 A1 | * | 6/2015 | Hecht | B25J 15/0004 294/192 |
| 2015/0216681 A1 | * | 8/2015 | Lipsey | A61F 2/582 623/60 |

* cited by examiner

*Primary Examiner* — Dean J Kramer

(57) ABSTRACT

A robotic hand includes a servo housing, a plastic circuit board (PCB), a motor, a planetary gear transmission assembly and a movable plate that are mounted within the servo housing, and a plurality of claws rotatably connected to the servo housing. The motor is electrically connected to the PCB. The planetary gear transmission assembly is connected to an output shaft of the motor. The movable plate is connected to an output shaft of the planetary gear transmission assembly and movable when driven by the planetary gear transmission assembly. One end of each of the claws is pivotally connected to the movable plate and the claws are rotatable toward or away from one another when driven by the movable plate.

10 Claims, 8 Drawing Sheets

US 10,022,874 B1

ROBOTIC HAND

CROSS REFERENCE TO RELATED APPLICATIONS

This application claims priority to Chinese Patent Application No. 201710902052.1, filed Sep. 28, 2017, which is hereby incorporated by reference herein as if set forth in its entirety.

BACKGROUND

1. Technical Field

The present disclosure generally relates to robots, and particularly to a robotic hand.

2. Description of Related Art

The use of robotic hands in various applications is apparent today. For example, some toy mechanical hands have been designed for kids. Although conventional robotic hands can meet basic requirements, there is still a need to provide an improved one.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
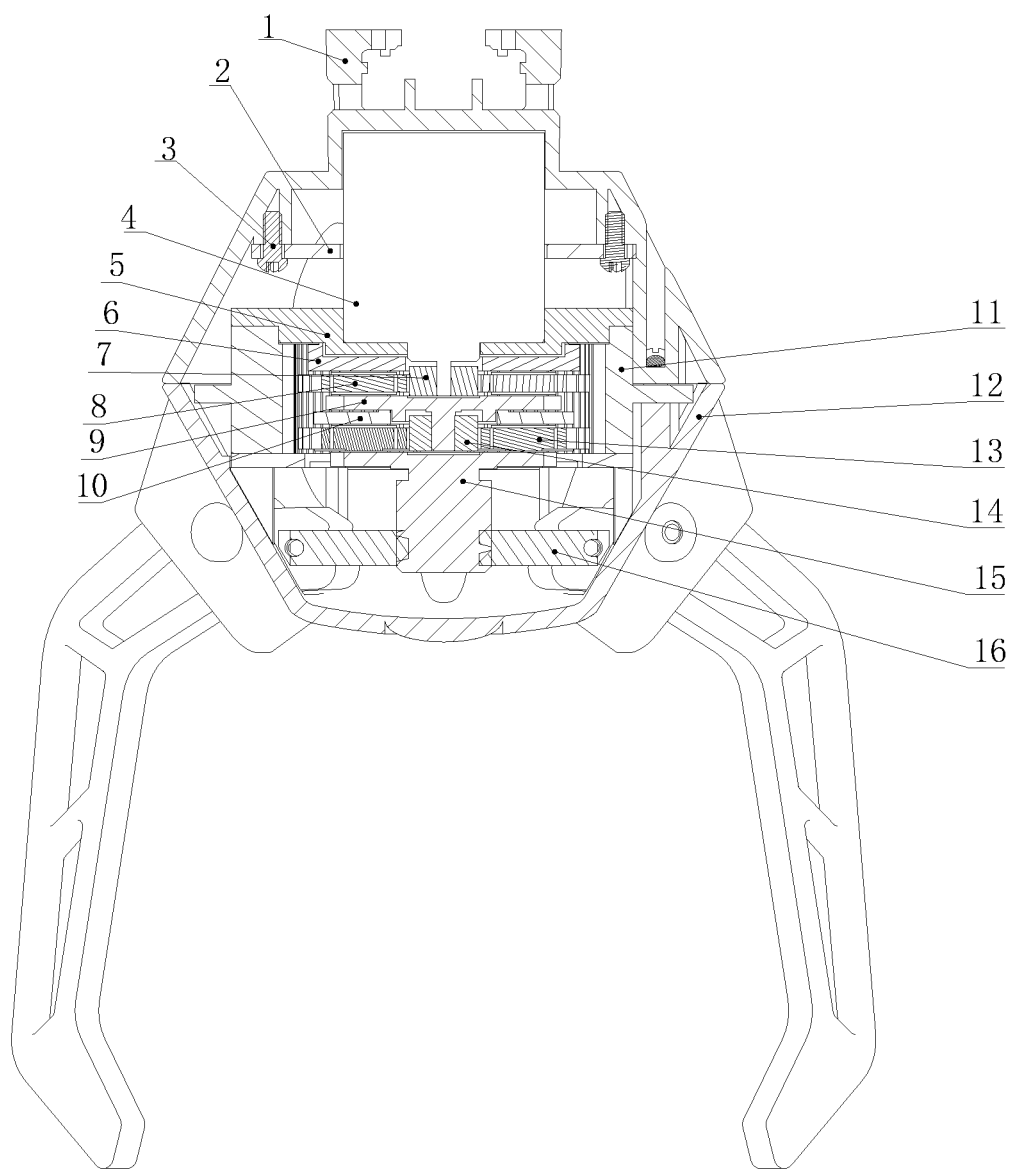
FIG. 1 is a first sectional view of a robotic hand in an open state according to one embodiment.
Figure 2:
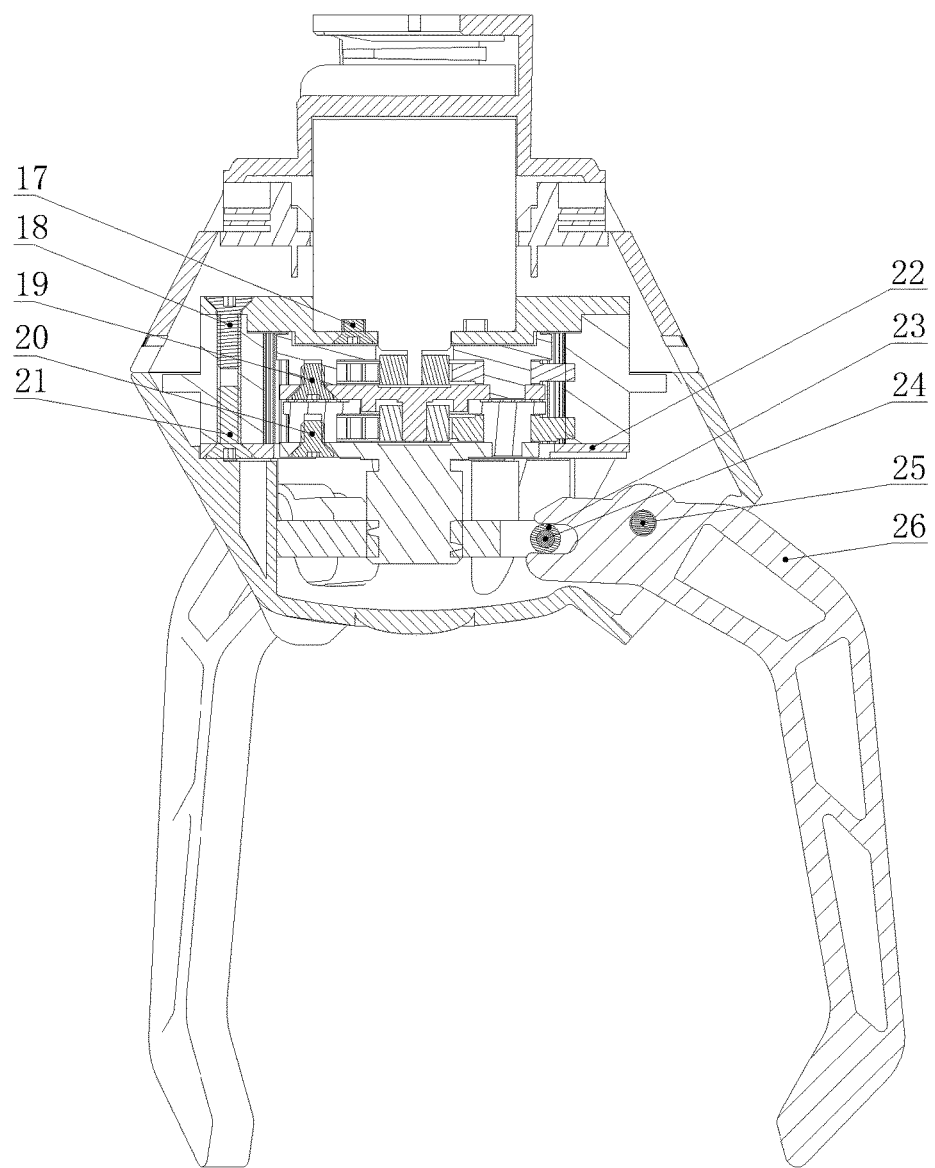
FIG. 2 is a second sectional view of the robotic hand of FIG. 1 in an open state.
Figure 3:
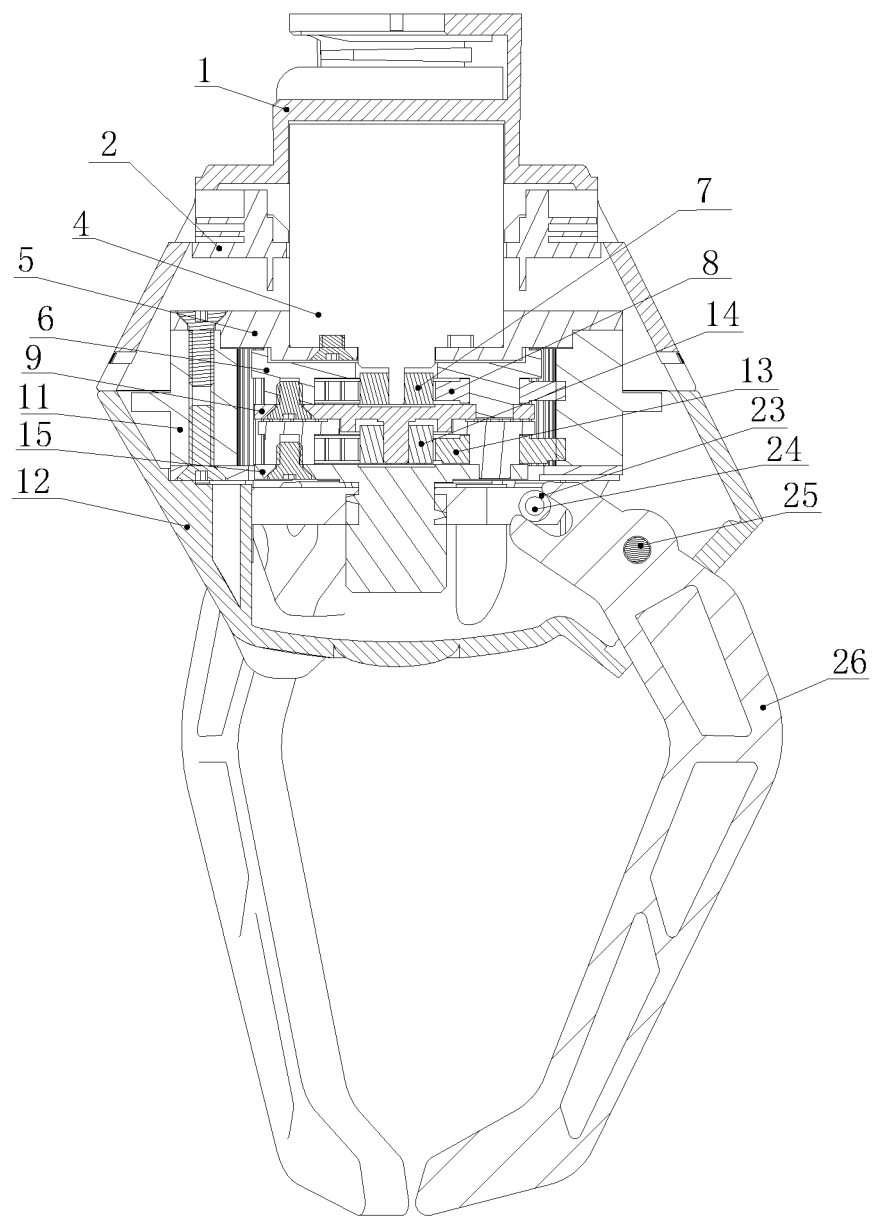
FIG. 3 is a sectional view of the robotic hand of FIG. 1 in a closed state.
Figure 4:
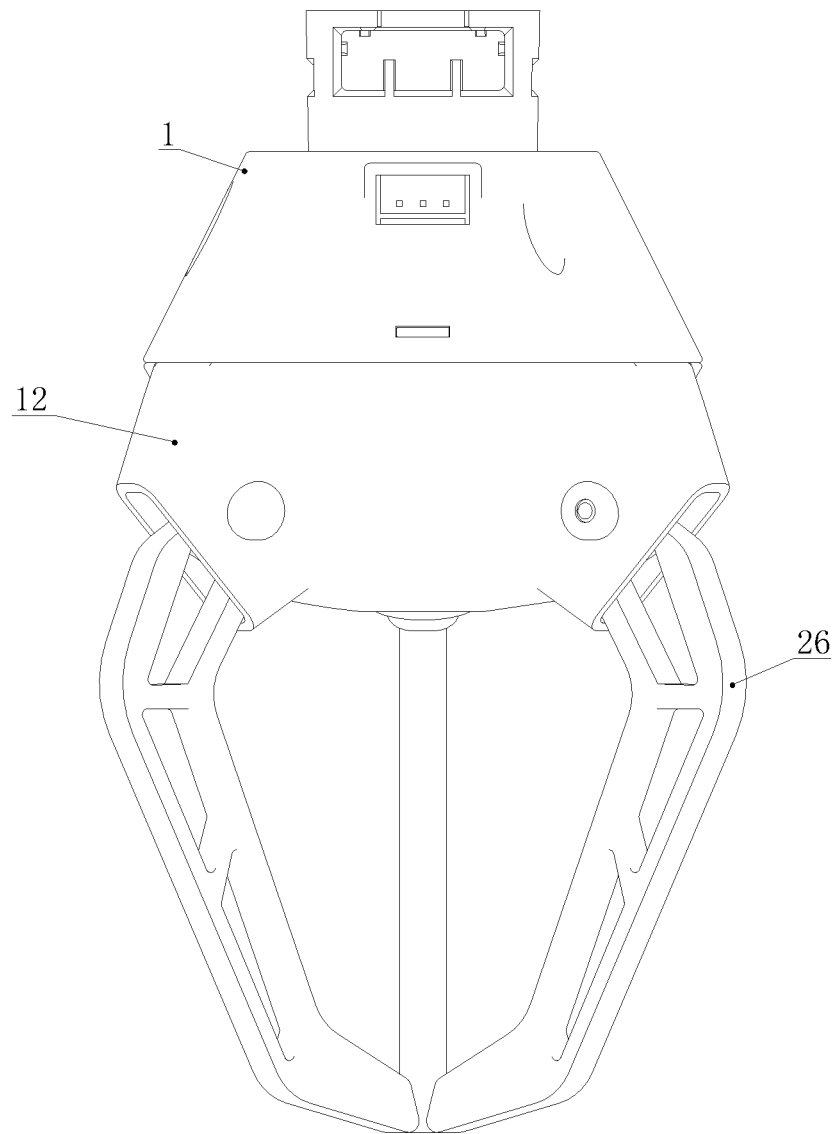
FIG. 4 is a front view of the robotic hand of FIG. 1 in a closed state.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Referring to FIGS. 1-4, in one embodiment, a robotic hand includes a servo housing, a plastic circuit board (PCB) 2, a motor 4, a planetary gear transmission assembly, a movable plate 16 and three claws 26. The PCB 2, the motor 4, the planetary gear transmission assembly and the movable plate 16 are arranged, from top to bottom, in the steering gear housing. The motor 4 is connected to the PCB 2 and can receive instructions from the PCB 2. The input end of the planetary gear transmission assembly is connected to an output shaft of the motor 4 and can rotate when driven by the motor 4. The movable plate 16 is connected to an output shaft of the planetary gear transmission assembly and movable when driven by the planetary gear transmission assembly. The three claws 26 are rotatably connected to the servo housing and are evenly spaced from one another. One end of each of the claws 26 is pivotally connected to the movable plate and the claws 26 are rotatable toward or away from one another when driven by the movable plate 16. When the movable plate 16 moves downward, it drives the claws 26 to rotate away from one another. More specifically, the free ends of the claws 26 move away from one another. In this case, the robotic hand opens gradually. When the movable plate 16 moves upward, it drives the claws 26 to rotate toward one another. More specifically, the free ends of the claws 26 move toward one another. In this case, the robotic hand closes gradually. With such configuration, the robotic hand can be used to grasp an object, such as a toy block. It should be understood that the number of the claws 26 can vary according to need.

The robotic hand of the embodiment can be used with building blocks. It can achieve a compact structure and meet functional requirements by using the planetary gear transmission assembly. When the PCB 2 sends an instruction to drive the motor 4 to rotate, the planetary gear transmission assembly is rotated and drives the movable plate 16 to move. The claws 26 rotate as driven by the movable plate 16, causing the robotic hand to open or close so as to release or grasp a building block.

The planetary gear transmission assembly includes an upper cover 5, a lower cover 22, and a planetary gear transmission assembly of at least two stages arranged between the upper cover 5 and the lower cover 22. The planetary gear transmission assembly includes an input end connected to the motor 4 and an output end connected to the movable plate 16. Specifically, the motor 4 is connected to the upper cover 5 via a first screw 17. The upper cover 5 may define a recessed portion. One end of the motor 4 is received in the recessed portion and the output shaft of the motor 4 passes through an opening defined in the bottom of the recessed portion and connected to the planetary gear transmission assembly.

Figure 6:
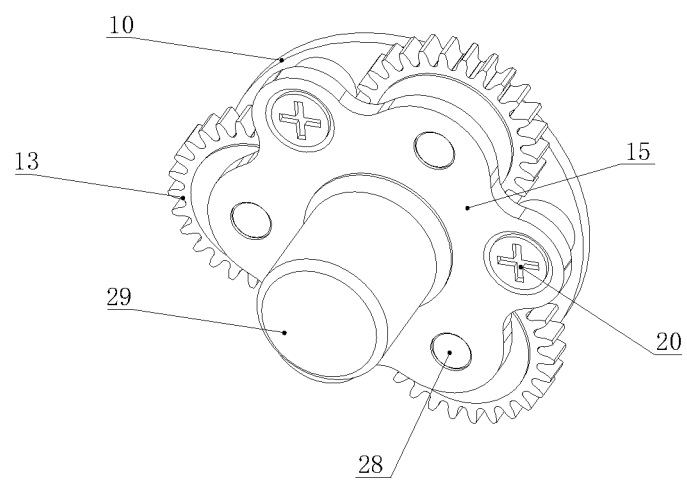
FIG. 6 is an isometric view of the second stage planetary gear transmission mechanism.
Figure 7:
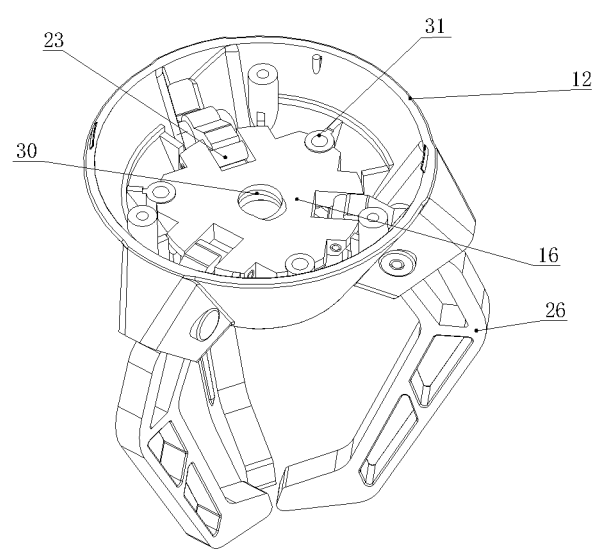
FIG. 7 is an isometric view of the robotic hand of FIG. 1, with some components omitted for clarity.

Referring also to FIGS. 6 and 7, the output end of the planetary gear transmission assembly includes a threaded shank 29 so as to drive the movable plate 16 to move. The threaded shank 29 includes threads in the lateral surface thereof. The movable plate 16 defines a through hole in a center thereof. Threads 30 are defined in the inner lateral surface of the through hole and engaged with the threaded shank 29. The movable plate 16 can move along the threaded shank 29 when the threaded shank 29 rotates.

Each stage of the planetary gear transmission assembly includes a sun gear, a plurality of planetary gears that are engaged with the sun gear, a gear carrier where the planetary gears are mounted, and a ring gear that is arranged around the gear carrier and is engaged with the planetary gears. The gear carrier includes a mounting panel, a plurality of shafts connected to the mounting panel, and a fixing panel fixed to the mounting panel. The planetary gears are respectively rotatably connected to the shafts, and one end of each of the shafts is received in the fixing panel.

It should be understood that the planetary gear transmission assembly may be two-staged or three-staged. A two-staged planetary gear transmission assembly is preferable considering the cost and function needed to achieve. The number of the planetary gears of each stage planetary gear mechanism is preferably three. A two-stage planetary gear transmission assembly will be described in detail as an example.

Figure 5:
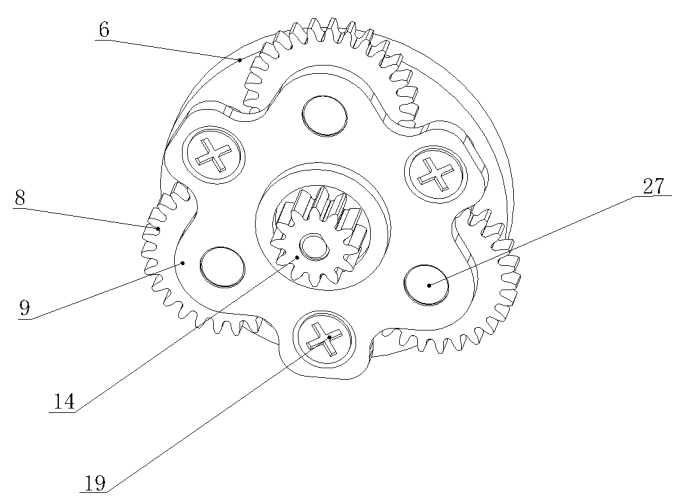
FIG. 5 is an isometric view of an assembly including a first stage planetary gear transmission mechanism and a second stage planetary gear transmission mechanism.

Referring to FIGS. 5 and 6, the planetary gear transmission assembly includes a first stage planetary gear transmission mechanism and a second stage planetary gear transmission mechanism. The first stage planetary gear transmission mechanism includes a sun gear 7 that serves as an input end of the planetary gear transmission assembly and is connected to the output shaft of the motor 4, three planetary gears 8 that are engaged with the sun gear 7, a first stage gear carrier where the planetary gears 8 are mounted, and a ring gear 11 that is arranged around the first stage gear carrier and is engaged with the planetary gears 8. The first stage gear carrier includes a mounting panel 6, three shafts 27 that are connected to the mounting panel 6, and a fixing panel 9 fixed to the mounting panel 6 via the shafts 27 and serves as the output end of the first stage planetary rear transmission mechanism. In one embodiment, one end of each of the shafts 27 is received in the fixing panel 9. The fixing panel 9 is fixed to the mounting panel 6 via second screws 19. Opposite ends of each of the shafts 27 and the second screws 19 are fixed to the fixing panel 9 and the mounting panel 6. In the embodiment, a power gear of the motor 4 may serve as the sun gear 7.

The second stage planetary gear transmission mechanism includes a sun gear 14 that serves as an input end of the second stage planetary gear transmission mechanism and is connected to the fixing panel 9, three planetary gears 13 that are engaged with the sun gear 7, a second stage gear carrier where the planetary gears 13 are mounted that serves as the output end of the planetary gear transmission assembly, and the ring gear 11 that is arranged around the second stage gear carrier and is engaged with the planetary gears 13. The second stage gear carrier includes a mounting panel 10, three shafts 28 that are connected to the mounting panel 10, and a fixing panel 15 that is fixed to the mounting panel 10 via the shafts 28 and serves as the output end of the planetary gear transmission assembly. In one embodiment, one end of each of the shafts 28 is received in the fixing panel 15. The fixing panel 9 is fixed to the mounting panel 6 via second screws 19. The sun gear 14 is connected to a shaft of the fixing panel 9. The fixing panel 15 is fixed to the mounting panel 10 via third screws 20, and serves as the power/torque outputting member of the planetary gear transmission assembly. The fixing panel 15 includes a threaded shank connected thereto. Opposite ends of each of the shafts 28 and the third screws 20 are fixed to the fixing panel 15 and the mounting panel 10.

The ring gear 11 is shared by the first stage planetary gear transmission mechanism and the second stage planetary gear transmission mechanism, which saves cost and space and facilitates the assembling/disassembling. The ring gear 11 is securely connected to the upper cover 5 through fourth screws 18, and securely connected to the lower cover 22 through fifth screws 21.

Figure 8:
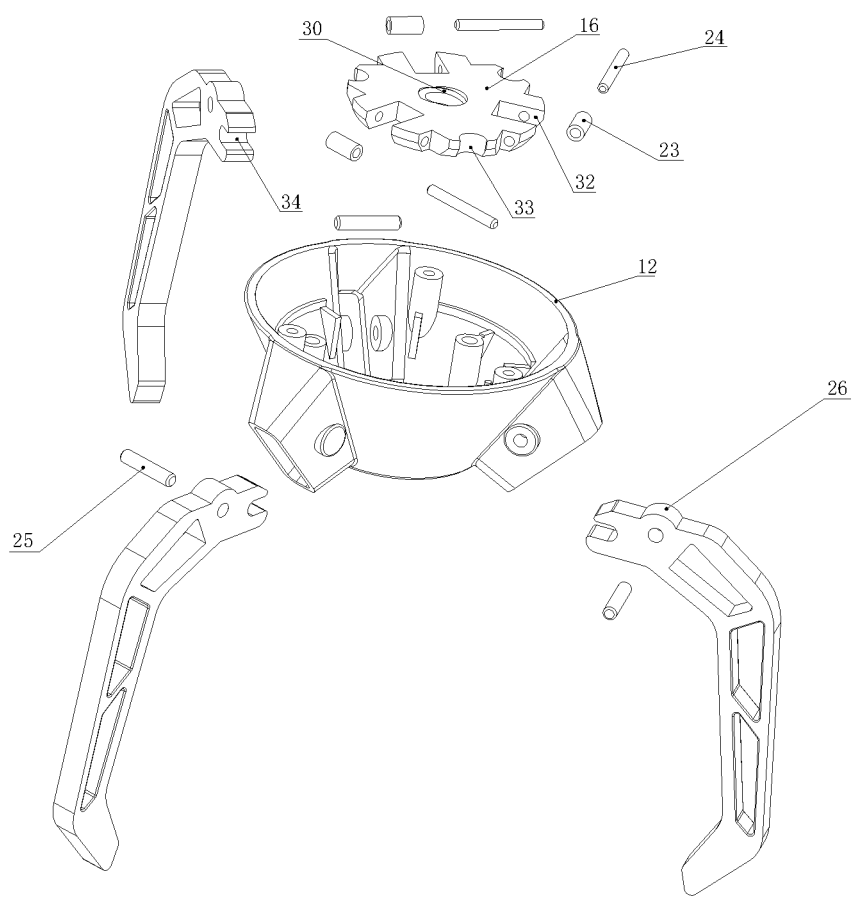
FIG. 8 is an isometric exploded view of the assembly of FIG. 7.

The servo housing includes an upper housing 1 and a lower housing 12 that are connected to each other. The PCB 2 is fixed to the upper housing 1 via sixth screws 3. The claws 26 are connected to the lower housing 12. The upper housing 1, the ring gear 11 and the lower housing 12 are connected to one another via screws. As shown in FIGS. 7 and 8, each claw 26 is rotatably connected to the lower housing 12 via an axle 25. Each claw 26 is rotatable with respect to the corresponding axle 25, while the axle is fixed to the lower housing 12.

The lower housing 12 includes a number of guiding posts 31 therein. The guiding posts 31 are parallel to each other and are evenly arranged around the circumferential direction of the lower housing 12. The movable plate 6 defines a number of recesses 33 that are respectively mated with the guiding posts 31. The recesses 33 allows the movable plate 6 to move along the guiding posts 31, but prevents the movable plate 6 from rotating. In the embodiment, the recesses 33 each are U shaped. The number of the guiding posts 31 is equal to the number of the recesses 33, both of which may vary according to need.

The robotic hand further includes a number of pins 24 and a number of sleeves 23 that are respectively arranged around the plurality of pins 24. The movable plate 16 defines a number of grooves 32. Opposite ends of each of the pins 24 are fixed to opposite sides of one of the grooves 32. In the embodiment, the grooves 32 and the recesses 33 are alternately arranged.

In one embodiment, each of the claws 26 includes an end that defines a notch 34. Each of the sleeves 23 is fit within one of the notches 34. Each pin 24 is rotatable with respect to the corresponding sleeve 23, and each sleeve 23 is securely fit within the corresponding notch 34. The claws 26 are then rotatable with respect to the movable plate 16. It is easy for the claws 26 to connect with the movable plate 16 by the engagement of the notches 34 with the sleeves 23. In the embodiment, the number of the sleeves 23 and the number of the pins 24 are both three.

In the embodiment, the upper housing, the lower housing and the planetary gear transmission assembly are connected to one another via screws.

The operation of the robotic hand is described as follows. The PCB 2 sends an instruction to drive the motor 4 to operate. The motor 4 then rotates the sun gear 7 which drives the planetary gears 8 to rotate. Since the three planetary gears 8 are engaged with the ring gear 11, the planetary gears 8, together with the mounting panel 6 and the fixing panel 9, revolve around the sun gear 7. Since the sun gear 14 of the second stage planetary gear transmission mechanism is fixed to the fixing panel 9, the fixing panel 9 thus not only functions as the outputting member of the first stage planetary gear transmission mechanism but also the inputting member of the second stage planetary gear transmission mechanism. Similarly, the sun gear 14 drives the planetary gears 13 to rotate. Since the planetary gears 13 are engaged with ring gear 11, the planetary gears 13, together with the mounting panel 10 and the fixing panel 15, revolve around the sun gear 14. The fixing panel 1 then drives the movable plate 16 to move so as to cause the robotic hand to open or close.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A robotic hand comprising a servo housing, a plastic circuit board (PCB), a motor, a planetary gear transmission assembly and a movable plate that are mounted within the servo housing, and a plurality of claws rotatably connected to the servo housing, wherein the motor is electrically connected to the PCB, the planetary gear transmission assembly is connected to an output shaft of the motor, the movable plate is connected to the planetary gear transmission assembly and movable when driven by the planetary gear transmission assembly, one end of each of the claws is pivotally connected to the movable plate and the claws are rotatable toward or away from one another when driven by the movable plate;

wherein the planetary gear transmission assembly comprises an output end that comprises a threaded shank, and the movable plate defines a threaded hole that is engaged with the threaded shank.

2. The robotic hand of claim 1, wherein the planetary gear transmission assembly includes an upper cover, a lower cover and a planetary gear transmission mechanism of at least two stages arranged between the upper cover and the lower cover, the planetary gear transmission mechanism comprises an input end connected to the motor and the output end.

3. The robotic hand of claim 2, wherein each stage of the planetary gear transmission mechanism comprises a sun gear, a plurality of planetary gears that are engaged with the sun gear, a gear carrier where the planetary gears are mounted, and a ring gear that is arranged around the gear carrier and is engaged with the planetary gears.

4. The robotic hand of claim 3, wherein the gear carrier comprises a mounting panel, a plurality of shafts connected to the mounting panel, and a fixing panel fixed to the mounting panel, the planetary gears are respectively rotatably connected to the shafts, and one end of each of the shafts is received in the fixing panel.

5. The robotic hand of claim 3, wherein the ring gear is utilized by each stage of the planetary gear transmission mechanism.

6. The robotic hand of claim 1, wherein the servo housing comprises an upper housing and a lower housing that are connected to each other, the PCB is fixed to the upper housing, and the claws are connected to the lower housing.

7. The robotic hand of claim 6, wherein the lower housing comprising therein a plurality of guiding posts, and the movable plate defines a plurality of recesses that are respectively mated with the guiding posts.

8. The robotic hand of claim 6, further comprising a plurality of pins and a plurality of sleeves that are respectively arranged around the plurality of pins, wherein the movable plate defines a plurality of grooves, opposite ends of each of the pins are fixed to opposite sides of one of the grooves, each of the claws comprises an end that defines a notch, and each of the sleeves is fit within one of the notches.

9. The robotic hand of claim 6, wherein each of the claws is rotatably connected to the lower housing via an axle.

10. A robotic hand comprising a servo housing, a plastic circuit board (PCB), a motor, a planetary gear transmission assembly and a movable plate that are mounted within the servo housing, and three claws rotatably connected to the servo housing, wherein the motor is electrically connected to the PCB, the planetary gear transmission assembly is connected to an output shaft of the motor, the movable plate is connected to an output end of the planetary gear transmission assembly and movable when driven by the planetary gear transmission assembly, the claws each comprises a connection end and the connection ends are pivotally connected to the movable plate at different positions thereof, and the claws are rotatable toward or away from one another when driven by the movable plate.

* * * * *